(12) United States Patent
Mouri et al.

(10) Patent No.: US 8,897,350 B2
(45) Date of Patent: Nov. 25, 2014

(54) ORTHOGONAL TRANSFORM ERROR CORRECTOR

(71) Applicant: Panasonic Corporation, Osaka (JP)

(72) Inventors: Hiroki Mouri, Osaka (JP); Kouichi Nagano, Osaka (JP); Hiroyuki Tezuka, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/309,626

(22) Filed: Jun. 19, 2014

(65) Prior Publication Data

US 2014/0301516 A1 Oct. 9, 2014

Related U.S. Application Data

(63) Continuation of application No. PCT/JP2013/000031, filed on Jan. 9, 2013.

(30) Foreign Application Priority Data

Jan. 20, 2012 (JP) ................. 2012-010073

(51) Int. Cl.
*H04B 3/46* (2006.01)
*H04B 17/00* (2006.01)
*H04Q 1/20* (2006.01)
*H04L 7/00* (2006.01)

(52) U.S. Cl.
CPC ................. *H04L 7/0016* (2013.01)
USPC ....................................... 375/226

(58) Field of Classification Search
USPC ............... 375/224, 226, 316, 324, 325, 340
See application file for complete search history.

(56) References Cited

U.S. PATENT DOCUMENTS

| | | | | |
|---|---|---|---|---|
| 5,577,072 | A * | 11/1996 | Moon et al. | 375/298 |
| 6,314,083 | B1 * | 11/2001 | Kishimoto et al. | 370/210 |
| 7,881,237 | B1 * | 2/2011 | Narasimhan | 370/280 |
| 8,107,551 | B2 * | 1/2012 | Monnerie | 375/269 |
| 2002/0158990 | A1 | 10/2002 | Kishi | |
| 2003/0185147 | A1 * | 10/2003 | Taga et al. | 370/210 |

(Continued)

FOREIGN PATENT DOCUMENTS

| | | |
|---|---|---|
| JP | 60-220871 A | 11/1985 |
| JP | 02-146844 A | 6/1990 |

(Continued)

OTHER PUBLICATIONS

D. Weiner et al., "The Image Rejection Harmonic Mixer," IEEE MTT-S Digest, 1982, pp. 36-38.

(Continued)

*Primary Examiner* — Jean B Corrielus
(74) *Attorney, Agent, or Firm* — McDermott Will & Emery LLP

(57) ABSTRACT

A phase adjuster arranges phases of waveforms of a complex signal after orthogonal transform. An edge detector detects an edge of the complex signal after phase adjustment. A phase shift detector detects phase shift of an output signal of the edge detector between the in-phase signal and the quadrature signal after the orthogonal transform, and outputs a phase error signal (PE). The oscillator connected to mixers and a shifter to perform the orthogonal transform includes a phase adjustment section adjusting an edge of a voltage controlled oscillator (VCO) clock based on the phase error signal (PE) and correcting the phase shift of an original signal.

6 Claims, 17 Drawing Sheets

(56) References Cited

U.S. PATENT DOCUMENTS

| | | |
|---|---|---|
| 2004/0029550 A1 | 2/2004 | Kishi |
| 2005/0147190 A1* | 7/2005 | Nishikawa .................... 375/343 |
| 2007/0024477 A1* | 2/2007 | Xu et al. ........................ 341/143 |
| 2009/0154589 A1* | 6/2009 | Monnerie ..................... 375/269 |
| 2009/0161529 A1* | 6/2009 | Speth ............................ 370/210 |
| 2010/0202570 A1* | 8/2010 | Tsai et al. ..................... 375/340 |
| 2011/0156824 A1 | 6/2011 | Atsumi |
| 2011/0189970 A1* | 8/2011 | Ohshiro ........................ 455/302 |

FOREIGN PATENT DOCUMENTS

| | | |
|---|---|---|
| JP | 2002-246847 A | 8/2002 |
| JP | 2003-309612 A | 10/2003 |
| JP | 2004-072532 A | 3/2004 |
| JP | 2005-252936 A | 9/2005 |
| JP | 2008-211619 A | 9/2008 |
| JP | 2010-028307 A | 2/2010 |
| JP | 2010-177831 A | 8/2010 |
| JP | 2011-135381 A | 7/2011 |

OTHER PUBLICATIONS

International Search Report issued in International Application No. PCT/JP2013/000031 with Date of Mailing Apr. 16, 2013, with English Translation.

* cited by examiner

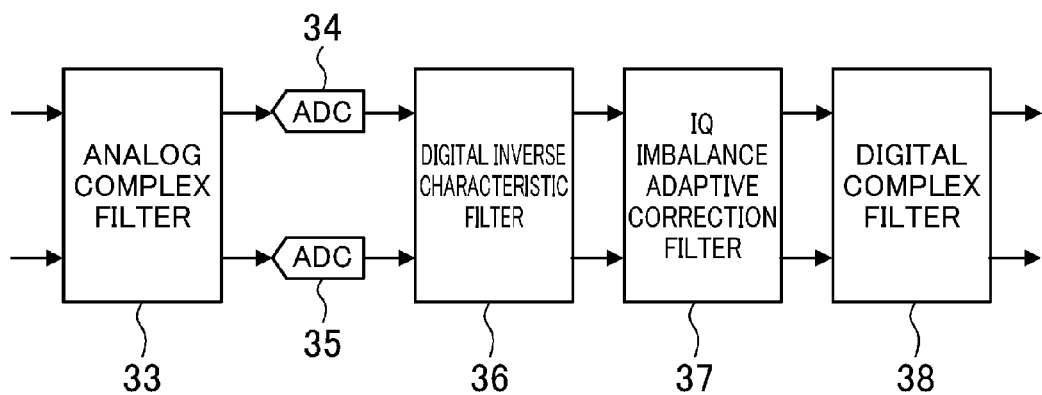
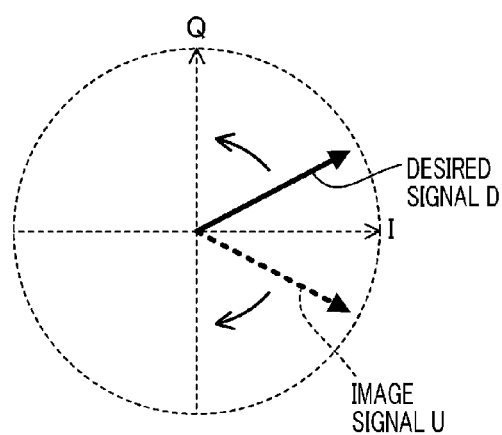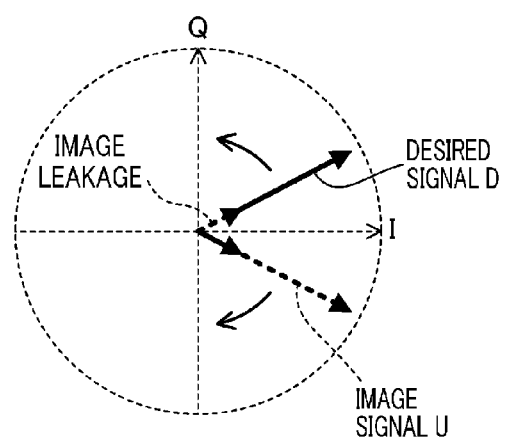

ORTHOGONAL TRANSFORM ERROR CORRECTOR

CROSS-REFERENCE TO RELATED APPLICATIONS

This is a continuation of International Application No. PCT/JP2013/000031 filed on Jan. 9, 2013, which claims priority to Japanese Patent Application No. 2012-010073 filed on Jan. 20, 2012. The entire disclosures of these applications are incorporated by reference herein.

BACKGROUND

The present disclosure relates to wireless signal processing techniques of generating an in-phase signal and a quadrature signal using a quadrature detector from a signal obtained by mixing a radio frequency signal and a local oscillation signal.

A well-known receiver multiplies a received radio frequency signal by a local oscillation signal, which is a complex signal, using a quadrature detector (i.e., a mixer) to perform quadrature detection, and processes the complex signal obtained after the quadrature detection. Such processing is widely generally known (see D. Weiner et al., The Image Rejection Harmonic Mixer, IEEE MTT-S DIGEST, 1982, pp. 36-38).

An in-phase signal and a quadrature signal, which form the complex signal after the quadrature detection, ideally have the same amplitude and are orthogonal. Actually, however, an error in the orthogonality and the amplitude may exist between the in-phase signal and the quadrature signal, which is also referred to as IQ imbalance. If such an error exists, in the complex signal after the quadrature detection, a desired signal is influenced by an image signal to degrade the quality of the desired signal. In order to address the problem, for example, frequency converters, etc., adjusting the phases and the amplitudes of in-phase signals and quadrature signals output from mixers are suggested (see Japanese Unexamined Patent Publication Nos. 2002-246847, 2003-309612, and 2004-72532).

SUMMARY

However, as described in Japanese Unexamined Patent Publication Nos. 2002-246847, 2003-309612, and 2004-72532, by simply adjusting the levels and the phases of the in-phase signals and the quadrature signals using a least mean square (LMS) algorithm, the levels and the phases of these signals do not necessarily have optimum values. If the levels and the phases of the in-phase signal and the quadrature signal are not optimum, orthogonal transform errors are not sufficiently corrected, and the influence of the image signals on the desired signals cannot be sufficiently reduced.

It is an objective of the present disclosure to improve the accuracy in correcting orthogonal transform errors.

In a 90 degree phase shift of a complex signal, an orthogonal transform error corrector according to the present disclosure detects how much the phase is shifted from an ideal, corrects the phase, and adjusts phase information for the correction using a phase adjuster. There are two possible adjusting means. One is to deviate the edges of a clock. The other is to set various parameters of a filter and adjust the phase amount.

As such, a lower load is needed to perform image rejection on a signal after the correction by eliminating the phase shift as much as possible.

The present disclosure accurately corrects orthogonal transform errors to sufficiently reduce the influence of an image signal on a desired signal.

BRIEF DESCRIPTION OF THE DRAWINGS

FIG. 2 is a circuit block diagram illustrating a detailed example configuration of an image rejection section of FIG. 1.

FIGS. 3A and 3B illustrate example vectors corresponding to signal points of a desired signal and an image signal in a complex plane. FIG. 3A illustrates where there is no IQ imbalance. FIG. 3B illustrates where there is IQ imbalance.

DETAILED DESCRIPTION

Figure 1:
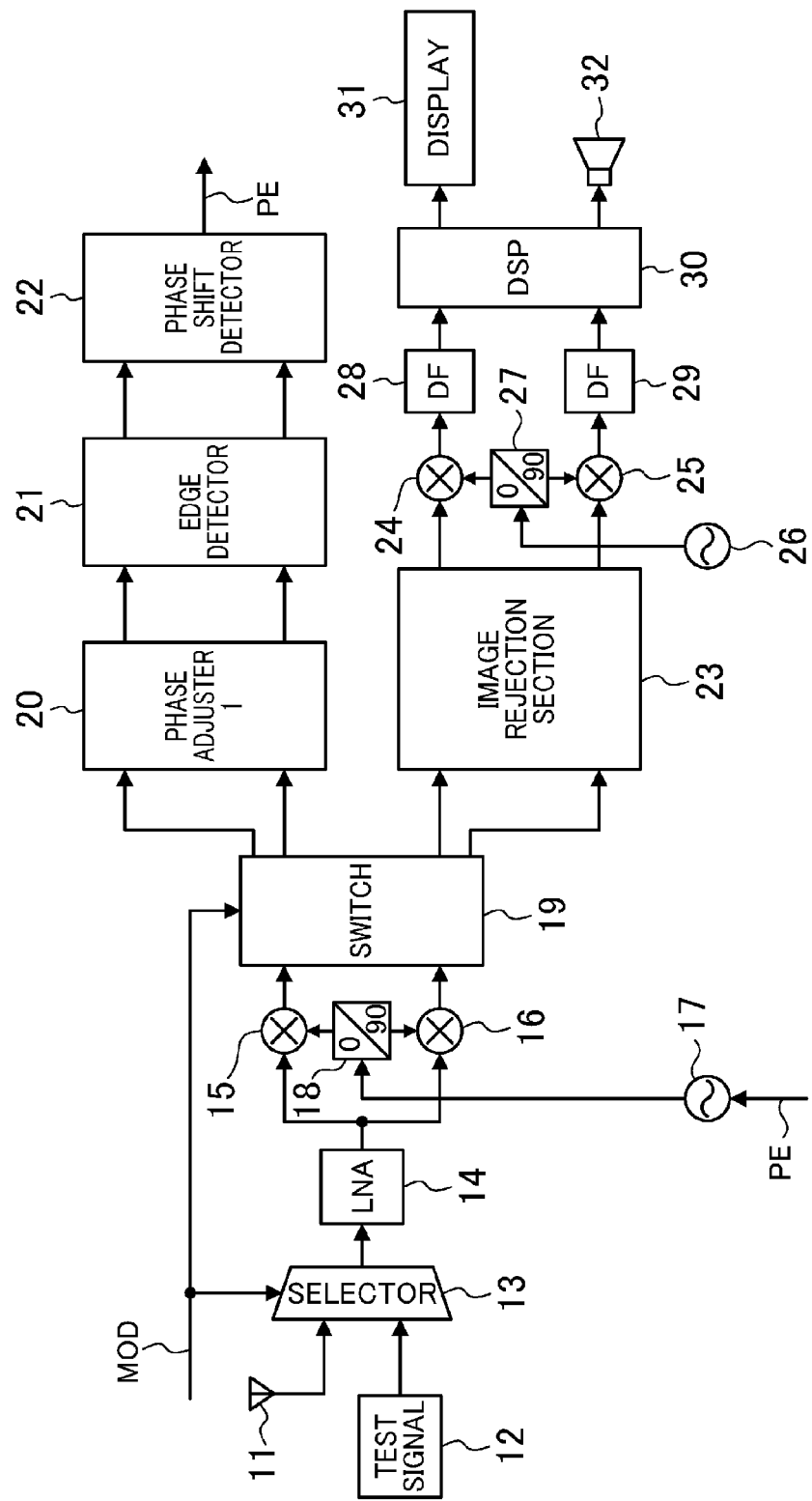
FIG. 1 is a circuit block diagram of a receiver including an orthogonal transform error corrector according to a first embodiment of the present disclosure.

Embodiments of the present disclosure will be described hereinafter with reference to the drawings. In the drawings, the same reference characters are used to represent equivalent or similar elements.

First Embodiment

FIG. 1 is a circuit block diagram of a receiver including an orthogonal transform error corrector according to a first embodiment of the present disclosure. FIG. 2 is a circuit block diagram illustrating a detailed example configuration of an image rejection section 23 of FIG. 1.

The receiver of FIG. 1 includes an antenna 11, a test signal 12, a selector 13, a low noise amplifier (LNA) 14, mixers 15, 16, 24 and 25, oscillators 17 and 26, shifters 18 and 27, a switch 19, a phase adjuster 20, an edge detector 21, a phase shift detector 22, the image rejection section 23, decimation filters 28 and 29, a digital signal processor (DSP) 30, a display 31, and a speaker 32. As shown in FIG. 2, the image rejection section 23 includes an analog complex filter 33, analog-to-digital conversion (ADC) sections 34 and 35, a digital inverse characteristic filter 36, an IQ imbalance adaptive correction filter 37, and a digital complex filter 38.

The phase adjuster 20, the edge detector 21, and the phase shift detector 22 of FIG. 1 operate as an orthogonal transform error corrector. Although not shown, the receiver of FIG. 1 includes a control section controlling the elements in FIG. 1.

The selector 13 supplies a radio frequency (RF) signal received by the antenna 11 or the test signal 12 to the LNA 14 in accordance with a mode signal MOD. The LNA 14 amplifies and outputs the signal received via the selector 13. The oscillator 17 generates and outputs a signal having a frequency needed to convert the RF signal to an intermediate frequency (IF) signal. The shifter 18 delays the phase of the signal generated by the oscillator 17 by 90 degrees and outputs the delayed signal. The mixer 15 multiplies the signal amplified by the LNA 14 by the signal generated by the oscillator 17 and outputs the obtained signal. The mixer 16 multiplies the signal amplified by the LNA 14 by the signal output form the shifter 18 and outputs the obtained signal. The output of the mixer 15 is an in-phase signal, that is, an I signal. The output of the mixer 16 is an quadrature signal, that is, a Q signal. The switch 19 supplies a complex signal formed by the I signal and the Q signal to the phase adjuster 20 or the image rejection section 23 in accordance with the mode signal MOD.

In the image rejection section 23, the analog complex filter 33 processes the complex signal formed by the output signals of the mixers 15 and 16 such that the signal level of a desired signal contained in the complex signal near an image frequency is low, and outputs the processed signal. This aims to allow the complex signal output form the analog complex filter 33 to fall within the dynamic ranges of the ADC sections 34 and 35. The ADC sections 34 and 35 convert the signals forming the complex signal output form the analog complex filter 33 to digital signals, and outputs the digital signals. The digital inverse characteristic filter 36 has inverse characteristics of the analog complex filter 33, processes the output signals of the ADC sections 34 and 35 to cancel the influence of the analog complex filter 33, and outputs the result. The IQ imbalance adaptive correction filter 37 corrects an orthogonality error and an amplitude error of the complex signal output from the digital inverse characteristic filter 36, and outputs the corrected complex signal to the digital complex filter 38. The digital complex filter 38 attenuates the image frequency component of the desired signal in the complex signal output from the IQ imbalance adaptive correction filter 37, and outputs a complex signal containing the attenuated image frequency component.

The oscillator 26 of FIG. 1 generates and outputs a signal having a frequency needed to convert an IF signal to a baseband signal. The shifter 27 delays the phase of the signal generated by the oscillator 26 by 90 degrees. The mixer 24 multiplies one of the complex signals output from the image rejection section 23 by the signal generated by the oscillator 26, and outputs the obtained signal. The mixer 25 multiplies the other one of the complex signals output from the image rejection section 23 by the signal output from the shifter 27, and outputs the obtained signal. The decimation filter 28 decimates a sample number of the output signal of the mixer 24, and outputs the obtained signal. The decimation filter 29 decimates a sample number of the output signal of the mixer 25, and outputs the obtained signal. The DSP 30 performs predetermined signal processing of the output signals of the both decimation filters 28 and 29, and outputs obtained video and audio signals. The display 31 displays an image based on the video signal output from the DSP 30. The speaker 32 outputs an audio based on the audio signal output from the DSP 30.

The phase adjuster 20 arranges the phases of the waveform of the complex signal after the orthogonal transform. The edge detector 21 detects the edges of the complex signal after the phase adjustment. The phase shift detector 22 detects, in an output signal of the edge detector 21, the phase shift between the in-phase signal and the quadrature signal after the orthogonal transform, and outputs a phase error signal PE. The oscillator 17 includes a phase adjustment section which adjusts the edges of a clock based on the phase error signal PE, and corrects the phase shift of the original signal.

Although the receiver of FIG. 1 receives, for example, frequency modulation (FM) radio broadcast signals, it may receive signals such as other radio broadcast signals, TV broadcast signals, and mobile phone signals.

FIG. 3A illustrates, in a complex plane, example vectors corresponding to signals points of the desired signal and the image signal where there is no IQ imbalance. FIG. 3B illustrates, in a complex plane, vectors corresponding to signals points of the desired signal and the image signal where there is IQ imbalance. FIG. 3A and FIG. 3B illustrate the complex signal after the quadrature detection, that is, the output signals of the mixers 15 and 16. If there is no IQ imbalance, as shown in FIG. 3A, a desired signal D and an image signal U do not interfere with each other. On the other hand, if there is IQ imbalance, as shown in FIG. 3B, image leakage of the same phase as the desired signal D occurs to interfere with the desired signal D.

Figure 4A:
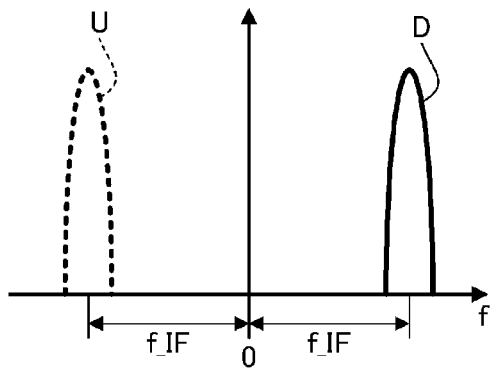
FIG. 4A is a spectrum corresponding to FIG. 3A.
Figure 4B:
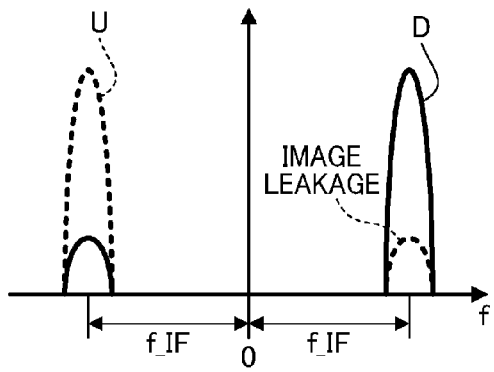
FIG. 4B is a spectrum corresponding to FIG. 3B.

FIG. 4A is a spectrum corresponding to FIG. 3A. FIG. 4B is a spectrum corresponding to FIG. 3B. If there is no IQ imbalance, as shown in FIG. 4A, the desired signal D and the image signal U are spaced apart from each other by frequencies 2f_IF, and do not interfere with each other. If there is IQ imbalance, as shown in FIG. 4B, the image leakage caused by the image signal overlaps the desired signal D. Thus, the frequency component near the desired signal D has greater electric power in FIG. 4B than in FIG. 4A. That is, if there is no IQ imbalance, the frequency component near the desired signal D has the minimum power.

The test signal 12 is a signal having a frequency correlative to a desired channel frequency. For example, when an FM wave station A is selected, which has a frequency of 100 MHz, a sine wave and a cosine wave having the frequency of 100 MHz are generated as the test signal 12. When an AM wave station B is selected, which has a frequency of 1000 kHz, a sine wave and a cosine wave having the frequency of 1000 kHz are generated as the test signal 12. The selector 13 and the switch 19 switch the signal path in accordance with a normal receipt mode, a calibration mode, etc., indicated by a mode signal MOD.

The orthogonal transform error corrector, which includes the phase adjuster 20, the edge detector 21, and the phase shift detector 22, obtains a phase error in calibration. Since the phase of a sine curve is shifted from the phase of a cosine curve by 90 degrees, a filter of the phase shifted by 90 degrees is provided for example as the phase adjuster 20. The edge detector 21 simply generates a square wave from a cosine curve and a sine curve using a comparator. The phase shift detector 22 calculates the edge deviation amount of several picoseconds with a delay operator utilizing a time-to-digital converter (TDC). As such, when the edge deviation amount is detected by the phase shift detector 22 as a phase error signal PE, the orthogonal transform is performed in accordance with the deviation amount. That is, since the oscillator 17 simulates clock generation using a voltage controlled oscillator (VCO), and clock timing may be shifted.

Figure 5:
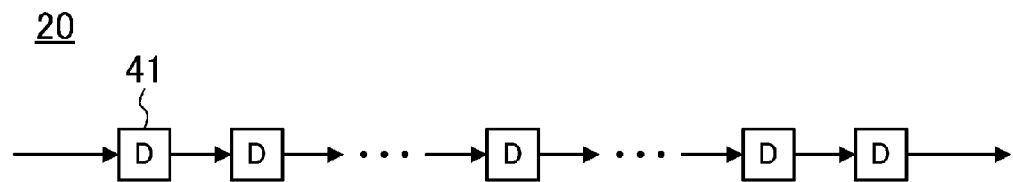
FIG. 5 is a circuit diagram illustrating a detailed example configuration of a phase adjuster of FIG. 1.

FIG. 5 is a circuit diagram illustrating a detailed example configuration of the phase adjuster 20 of FIG. 1. The phase adjuster 20 of FIG. 5 is a delay circuit formed by cascade-connecting the latches 41 such that the phases are shifted by 90 degrees.

For example, assume that the phases of the cosine curve and the sine curve are shifted by 90 degrees in an ADC sampling clock of 100 MHz. If the sine curve is shifted by a ¾ period (i.e., 270 degrees) along the time axis, the sine curve has the same phase as the cosine curve. If the cosine curve is shifted by a ¼ period (i.e., 90 degrees) along the time axis, the cosine curve has the same phase as the sine curve. The sampling point can be shifted by a simulated period by delaying the time by a simulated sampling point using the delay circuit as shown in FIG. 5.

Figure 6:
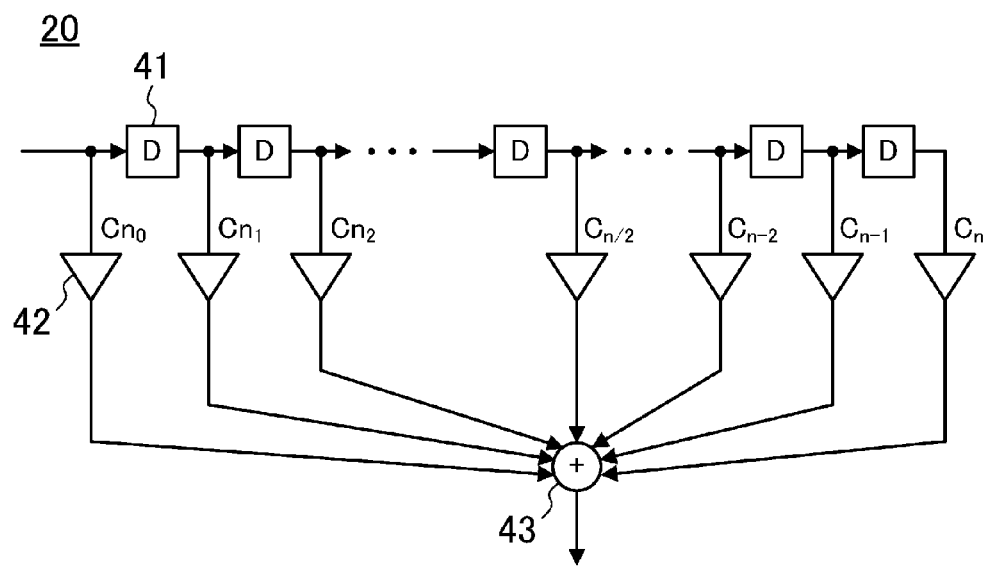
FIG. 6 is a circuit diagram illustrating another detailed example configuration of the phase adjuster of FIG. 1.

FIG. 6 is a circuit diagram illustrating another detailed example configuration of the phase adjuster 20 of FIG. 1. The phase adjuster 20 of FIG. 6 is a finite-duration impulse-response (FIR) filter including n-stage latches 41, where n is an integer, amplifiers 42 having tap coefficients Cn0-Cn, and a single adder 43. For example, any one of the tap coefficients is fixed to 1, and the other tap coefficients are 0 (i.e., what is input is delayed and output without change). Gain control is possible by employing the configuration of the FIR filter as shown in FIG. 6.

Figure 7:
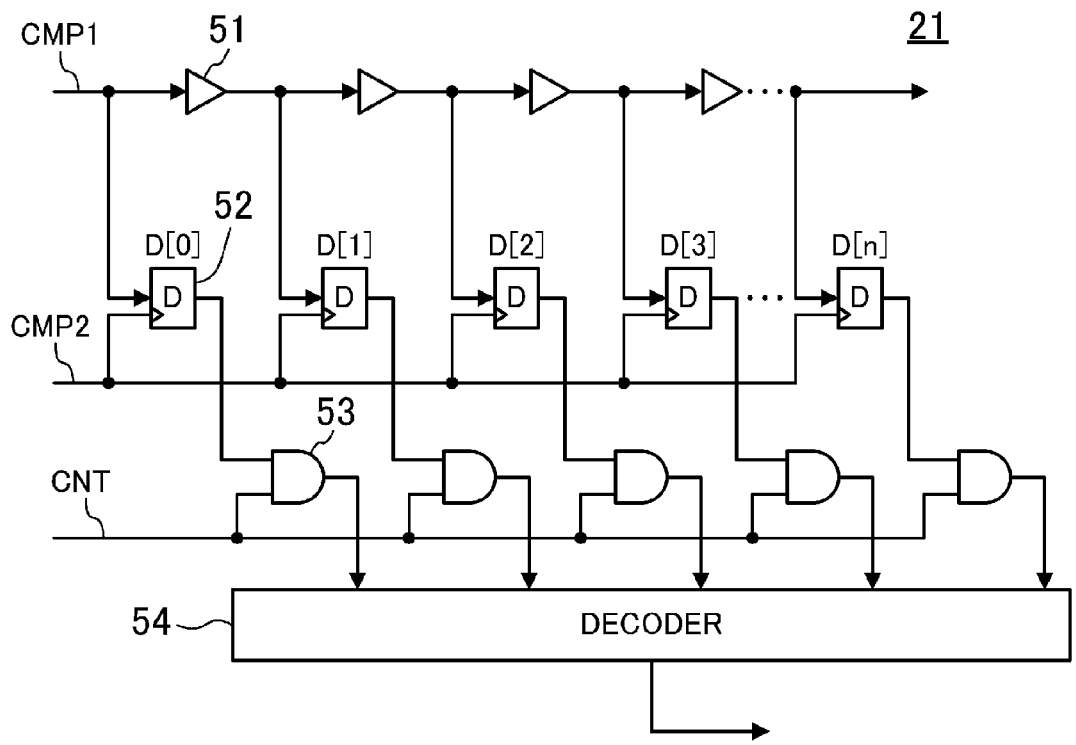
FIG. 7 is a circuit diagram illustrating a detailed example configuration of an edge detector of FIG. 1.

FIG. 7 is a circuit diagram illustrating a detailed example configuration of the edge detector 21 of FIG. 1. The edge detector 21 of FIG. 7 includes multi-stage delay elements 51 sequentially delaying a first comparator output CMP1, multi-stage latches 52 holding the outputs of the delay elements 51 as data D[0]-D[n] in accordance with the timing of a second comparator output CMP2, multi-stage AND circuits 53 controlling the outputs of the latches 52 with a control signal CNT, and a decoder 54 decoding the outputs of the AND circuits 53.

Figure 8:
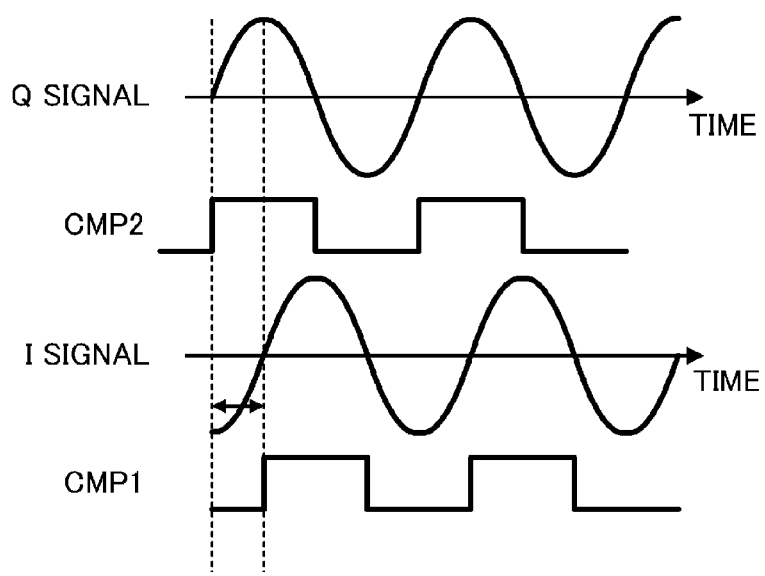
FIG. 8 is a signal waveform diagram for illustrating the operation of the edge detector of FIG. 7.

FIG. 8 is a signal waveform diagram for illustrating the operation of the edge detector 21 of FIG. 7. In the edge detector 21 of FIG. 7, the decoder 54 detects the position holding H="1" in the multi-stage latches 52, thereby clarifying the stage number. When the stage number is clear, the delay amount, that is, the phase error amount is found.

The I signal and the Q signal are converted to square waves by respective comparators. The second comparator output CMP2 deriving from the Q signal is regarded as a clock signal to find an edge start time of the first comparator output CMP1 deriving from the I signal. Where the I signal is shifted from the Q signal by 3 picoseconds, the first comparator output CMP1 remains L="0" in 3 picoseconds after the rising edge of the second comparator output CMP2, and then becomes H="1." For example, where the delay amount of a single stage of the delay elements 51 is 1 picosecond and one clock period is 12 picoseconds, the output of the decoder 54 is "000111111000." Eventually, the shift of 3 picoseconds is found.

Figure 9:
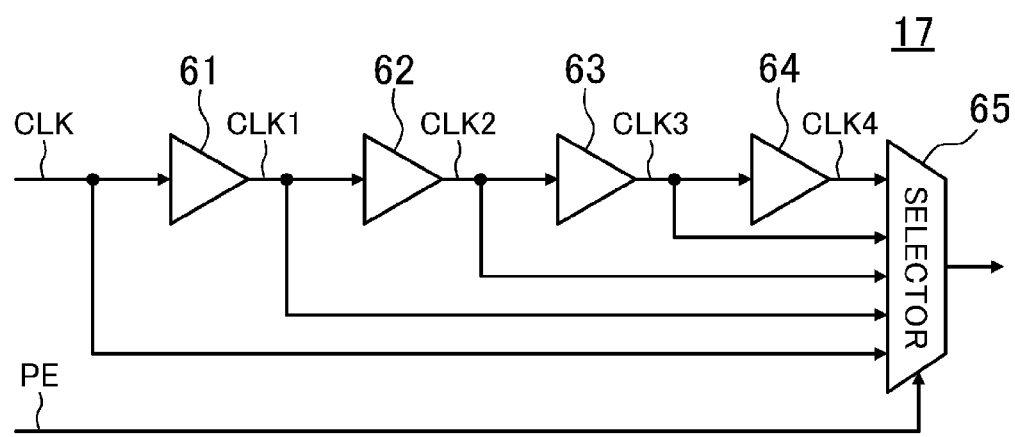
FIG. 9 is a circuit diagram illustrating an example configuration of an edge adjustment circuit included in the oscillator of FIG. 1.

FIG. 9 is a circuit diagram illustrating an example configuration of an edge adjustment circuit included in the oscillator 17 of FIG. 1. The edge adjustment circuit of FIG. 9 includes delay elements 61, 62, 63, and 64 sequentially delaying a clock signal CLK used for the VCO, and a selector 65 receiving the phase error signal PE.

Figure 10:
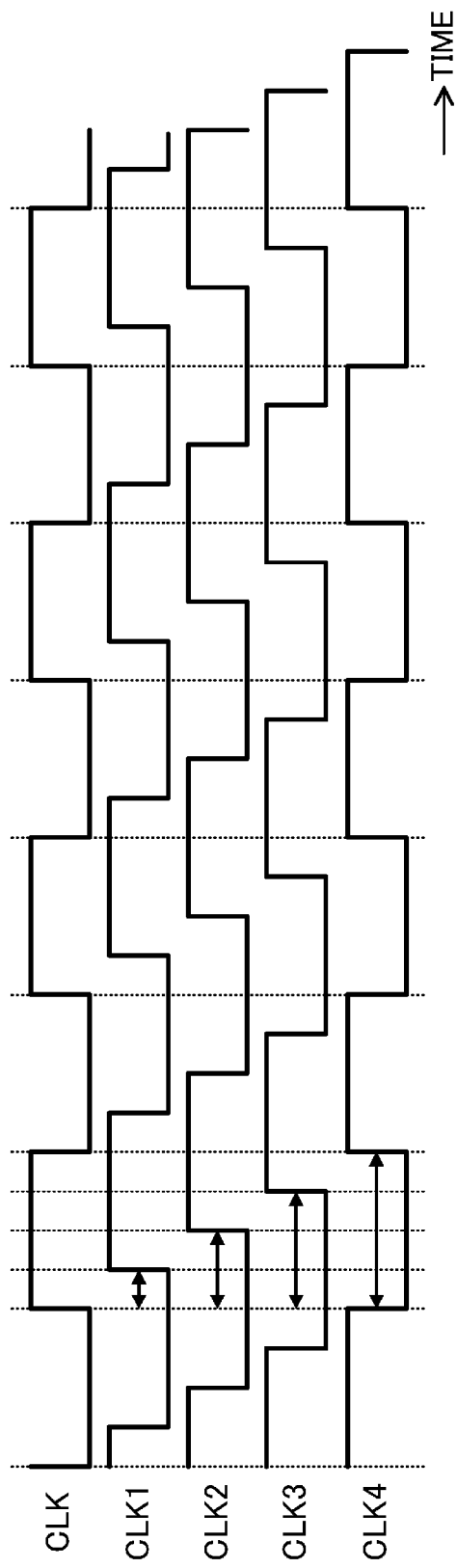
FIG. 10 is a signal waveform diagram for illustrating the operation of the edge adjustment circuit of FIG. 9.

FIG. 10 is a signal waveform diagram for illustrating the operation of the edge adjustment circuit of FIG. 9. Based on the clock signal CLK, the delay elements 61-64 gradually provide greater edge shifts as the stage number increases as CLK1, CLK2, CLK3, and CLK4. Then, the selector 65 selects a proper delay clock signal corresponding to the phase error signal PE.

Figure 11:
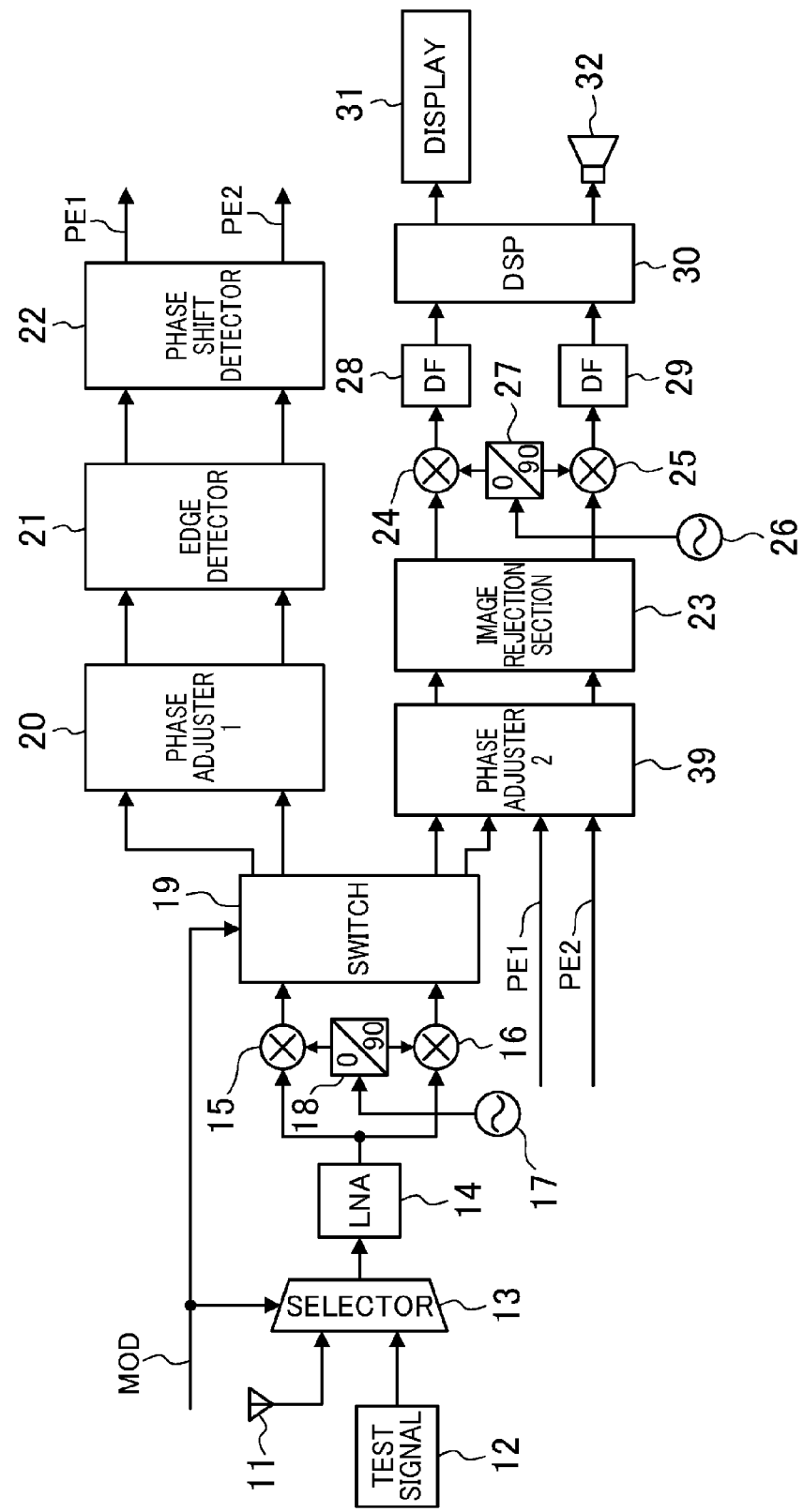
FIG. 11 is a circuit block diagram illustrating a variation of the receiver of FIG. 1.

FIG. 11 is a circuit block diagram illustrating a variation of the receiver of FIG. 1. The receiver of FIG. 11 also includes a phase adjuster 39 between the switch 19 and the image rejection section 23. The phase adjuster 39 tunes a built-in filter based on phase error signals PE1 and PE2 obtained by the phase shift detector 22.

Figure 12:
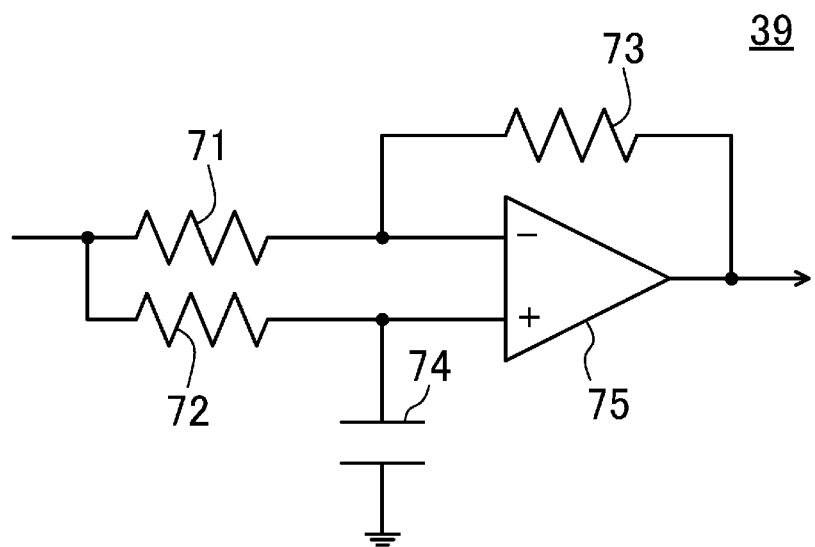
FIG. 12 is a circuit diagram illustrating a detailed example configuration of a phase adjuster of FIG. 11.

FIG. 12 is a circuit diagram illustrating a detailed example configuration of the phase adjuster 39 of FIG. 11. The circuit of FIG. 12 includes resistive elements 71-73, a capacitive element 74, and an operational amplifier 75. The phase adjuster 39 performs 90-degree phase delay using a conventional all-pass filtering technique and tunes the elements 71-74.

Figure 13:
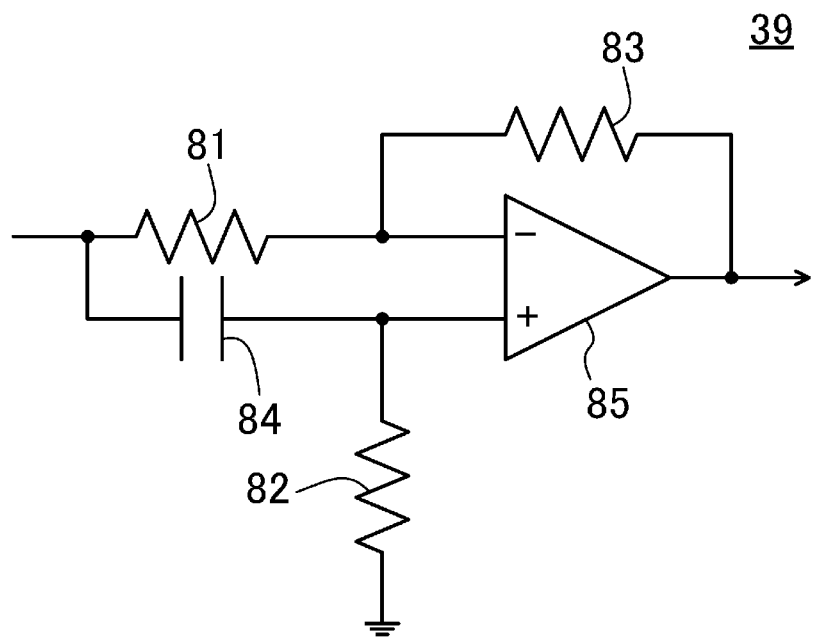
FIG. 13 is a circuit diagram illustrating another detailed example configuration of the phase adjuster of FIG. 11.

FIG. 13 is a circuit diagram illustrating another detailed example configuration of the phase adjuster 39 of FIG. 11. The circuit of FIG. 13 includes resistive elements 81-83, a capacitive element 84, and an operational amplifier 85. The phase adjuster 39 performs 90-degree phase advance using a conventional all-pass filtering technique and tunes the elements 81-84.

Second Embodiment

Figure 14:
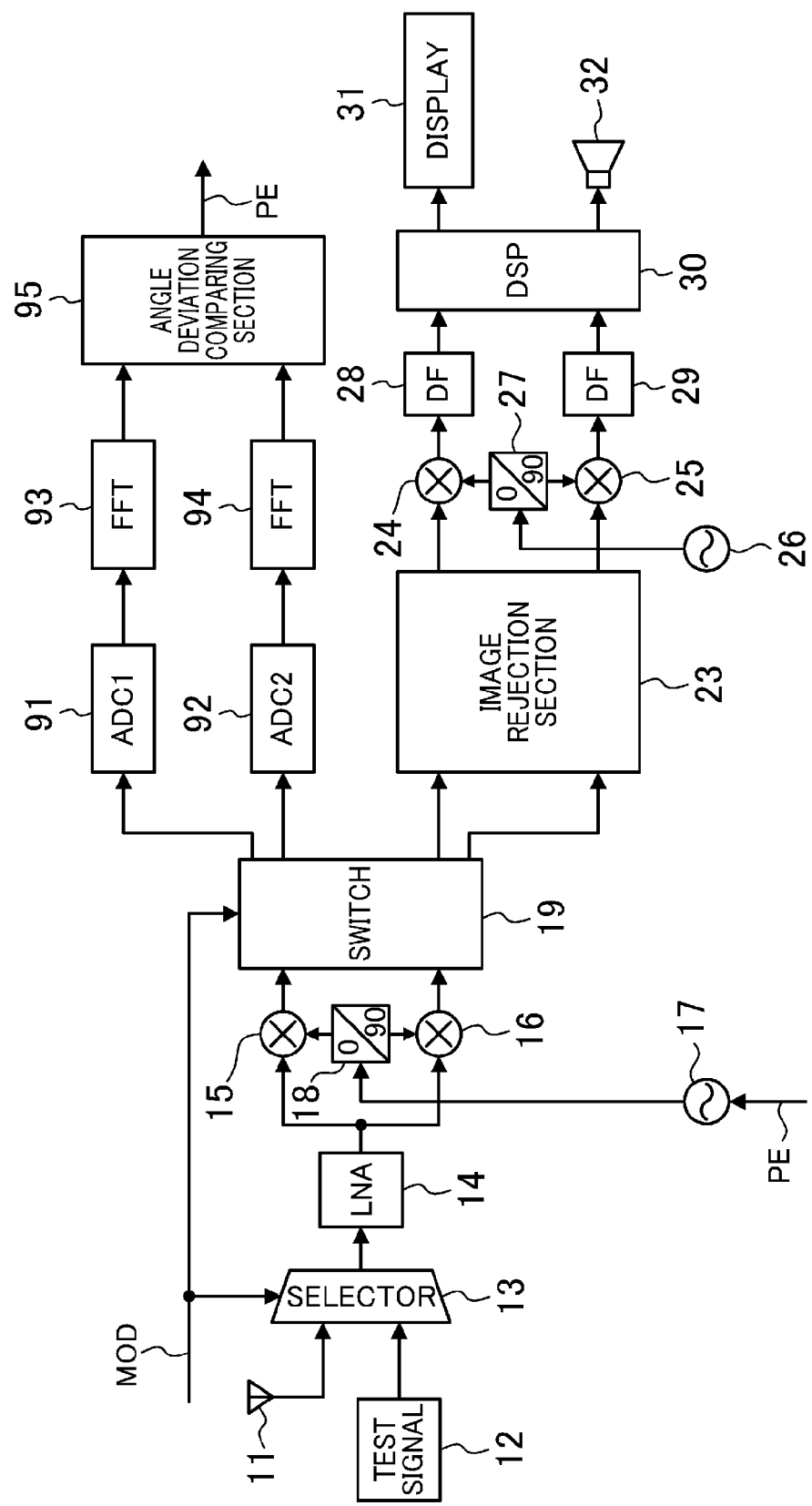
FIG. 14 is a circuit block diagram of a receiver including an orthogonal transform error corrector according to a second embodiment of the present disclosure.

FIG. 14 is a circuit block diagram of a receiver including an orthogonal transform error corrector according to a second embodiment of the present disclosure. The receiver of FIG. 14 includes ADC sections 91 and 92, fast Fourier transform (FFT) sections 93 and 94, and an angle deviation comparison section 95. These elements operate as the orthogonal transform error corrector.

The ADC sections 91 and 92 perform analog-digital conversion of a complex signal (e.g., a cosine curve and a sine curve) after the orthogonal transform supplied via a switch 19. The FFT sections 93 and 94 perform FFT to extract phase information from output data of the ADC sections 91 and 92, thereby obtaining angle information indicating the phases. The angle deviation comparison section 95 calculates a phase error between the output data of the FFT sections 93 and 94, and outputs a phase error signal PE. The oscillator 17 includes a phase adjustment section adjusting the edges of a clock based on the phase error signal PE, and correcting the phase shift of the original signal.

Figure 15:
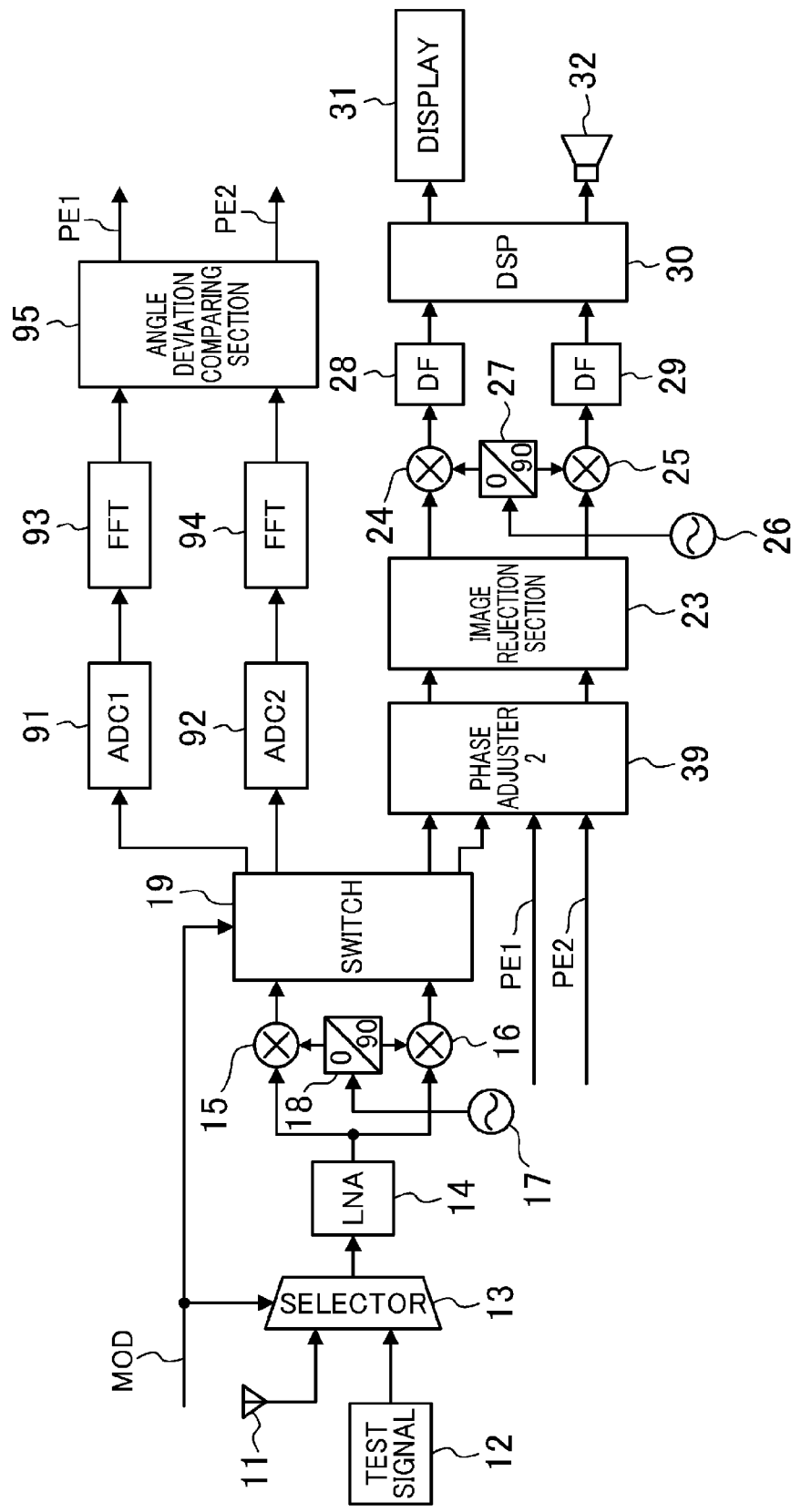
FIG. 15 is a circuit block diagram illustrating a variation of the receiver of FIG. 14.

FIG. 15 is a circuit block diagram illustrating a variation of the receiver of FIG. 14. Similar to FIG. 11, the receiver of FIG. 14 also includes a phase adjuster 39 between the switch 19 and an image rejection section 23. The phase adjuster 39 tunes a built-in filter (see FIGS. 12 and 13) based on phase error signals PE1 and PE2 obtained by the angle deviation comparison section 95.

Third Embodiment

Figure 16:
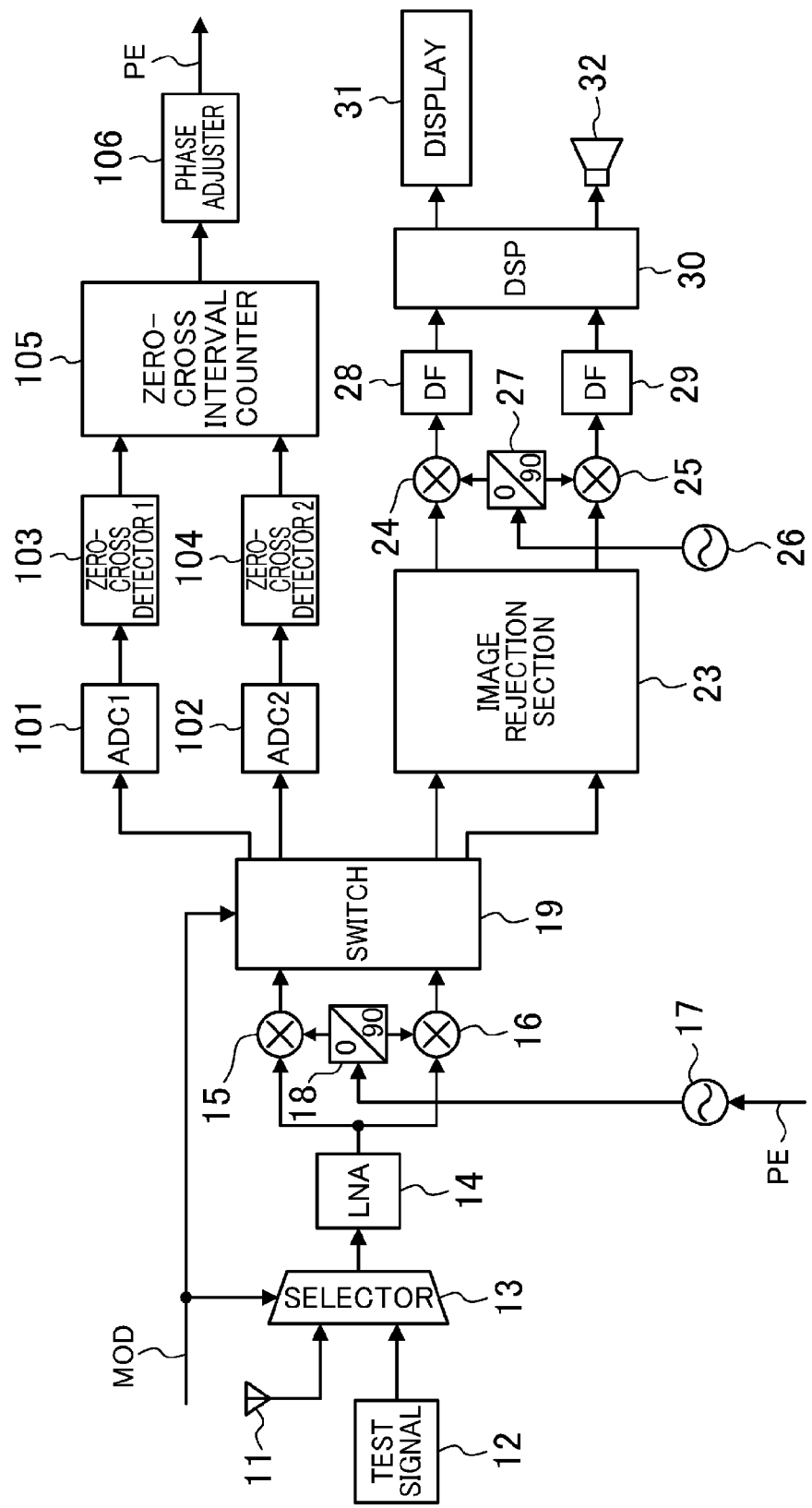
FIG. 16 is a circuit block diagram of a receiver including an orthogonal transform error corrector according to a third embodiment of the present disclosure.

FIG. 16 is a circuit block diagram of a receiver including an orthogonal transform error corrector according to a third embodiment of the present disclosure. The receiver of FIG. 16 includes ADC sections 101 and 102, zero-cross detectors 103 and 104, a zero-cross interval counter 105, and a phase adjuster 106. These elements operate as the orthogonal transform error corrector.

The ADC sections 101 and 102 perform analog-digital conversion of a complex signal (e.g., a cosine curve and a sine curve) after the orthogonal transform supplied via a switch 19. The zero-cross detectors 103 and 104 perform zero-cross detection using two points in the output data of the ADC sections 101 and 102. The zero-cross interval counter 105 counts the interval between the output signals of the zero-cross detectors 103 and 104. The phase adjuster 106 compares the values counted by the zero-cross interval counter 105, obtains a phase shift amount from the differential information, and outputs a phase error signal PE. The oscillator 17 includes a phase adjustment section adjusting the edges of a clock based on the phase error signal PE, and correcting the phase shift of the original signal.

Figure 17:
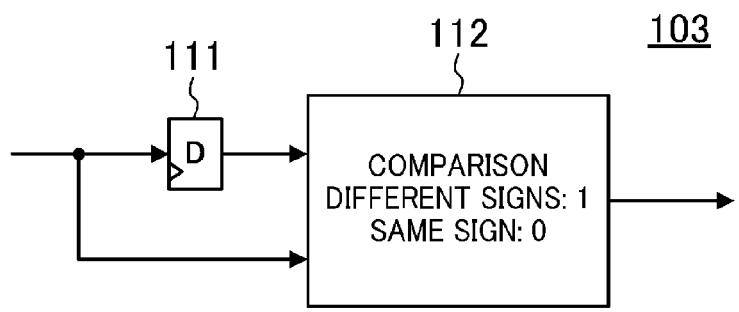
FIG. 17 is a circuit diagram illustrating a detailed example configuration of a zero-cross detector of FIG. 16.

FIG. 17 is a circuit diagram illustrating a detailed example configuration of the zero-cross detector 103 of FIG. 16. The zero-cross detector 103 of FIG. 17 employs two-point calculation, and includes a latch 111 and a comparison section 112. The comparison section 112 compares the signs of the input and the output of the latch 111.

Figure 18A:
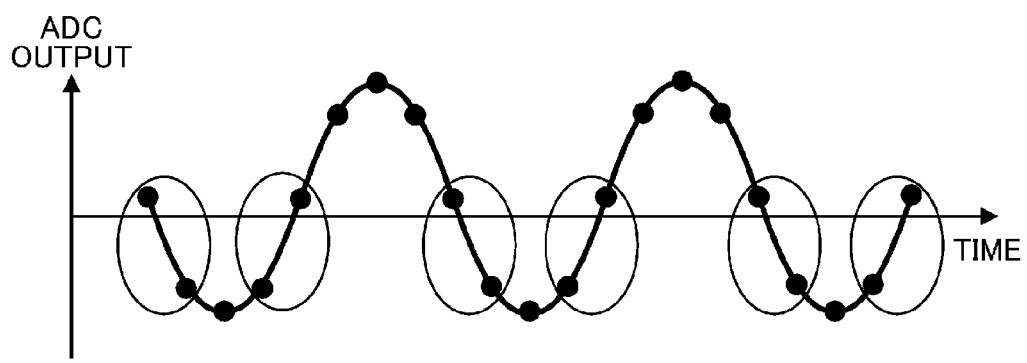
FIGS. 18A and 18B are signal waveform diagrams for illustrating the operation of the zero-cross detector of FIG. 17.
Figure 18B:
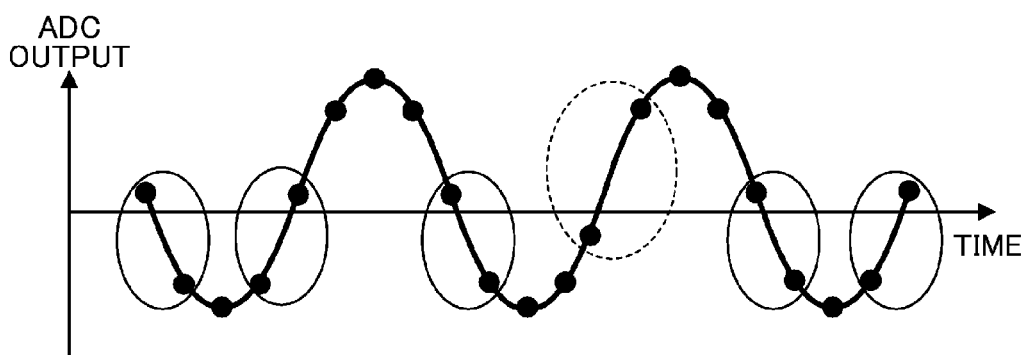

FIGS. 18A and 18B are signal waveform diagrams for illustrating the operation of the zero-cross detector 103 of FIG. 17. Solid circles in FIG. 18A indicate zero-cross points simulated in the two-point calculation. A broken circle in FIG. 18B indicates that one of the points is shifted in one direction in the two-point calculation to cause determination omission and detection delay.

Figure 19:
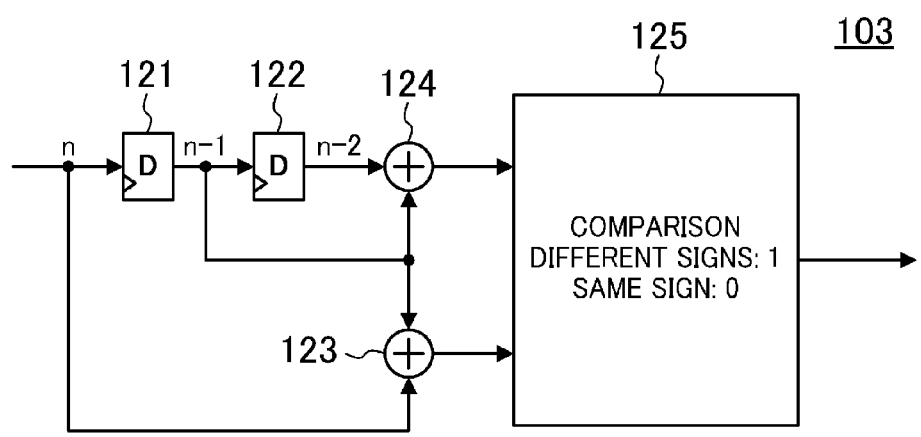
FIG. 19 is a circuit diagram illustrating another detailed example configuration of the zero-cross detector of FIG. 16.

FIG. 19 is a circuit diagram illustrating another detailed example configuration of the zero-cross detector 103 of FIG. 16. The zero-cross detector 103 of FIG. 19 employs three-point calculation, and includes latches 121 and 122, adders 123 and 124, and a comparison section 125. The one adder 123 adds n-th data to n−1-th data. The other adder 124 adds n−1-th data to n−2-th data. The comparison section 125 compares the signs of the outputs of the two adders 123 and 124.

Figure 20:
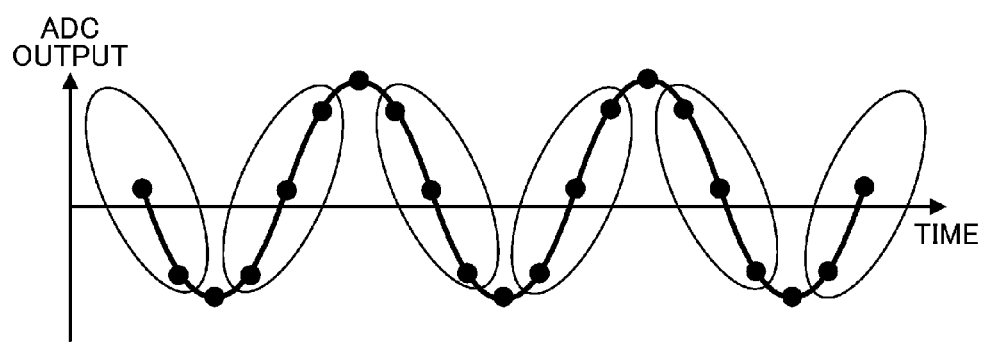
FIG. 20 is a signal waveform diagram for illustrating the operation of the zero-cross detector of FIG. 19.

FIG. 20 is a signal waveform diagram for illustrating the operation of the zero-cross detector 103 of FIG. 19. It represents that omission of determination and detection delay hardly occur even if the one of the points is shifted in one direction in the three-point calculation.

Figure 21:
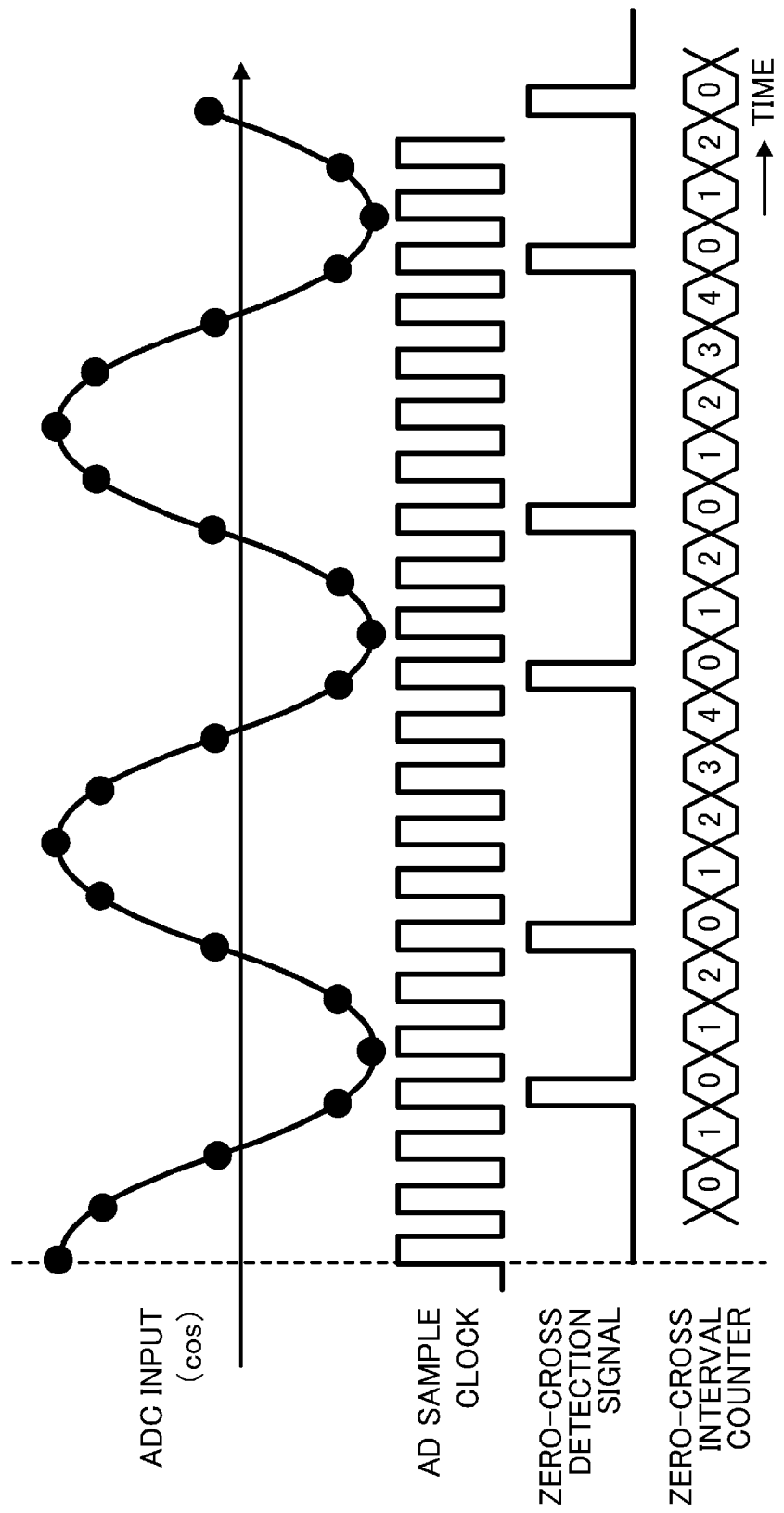
FIG. 21 is a signal waveform diagram for illustrating the operation of the orthogonal transform error corrector of FIG. 16.

FIG. 21 is a signal waveform diagram for illustrating the operation of the orthogonal transform error corrector of FIG. 16 where the input of the ADC is a cosine wave.

Figure 22:
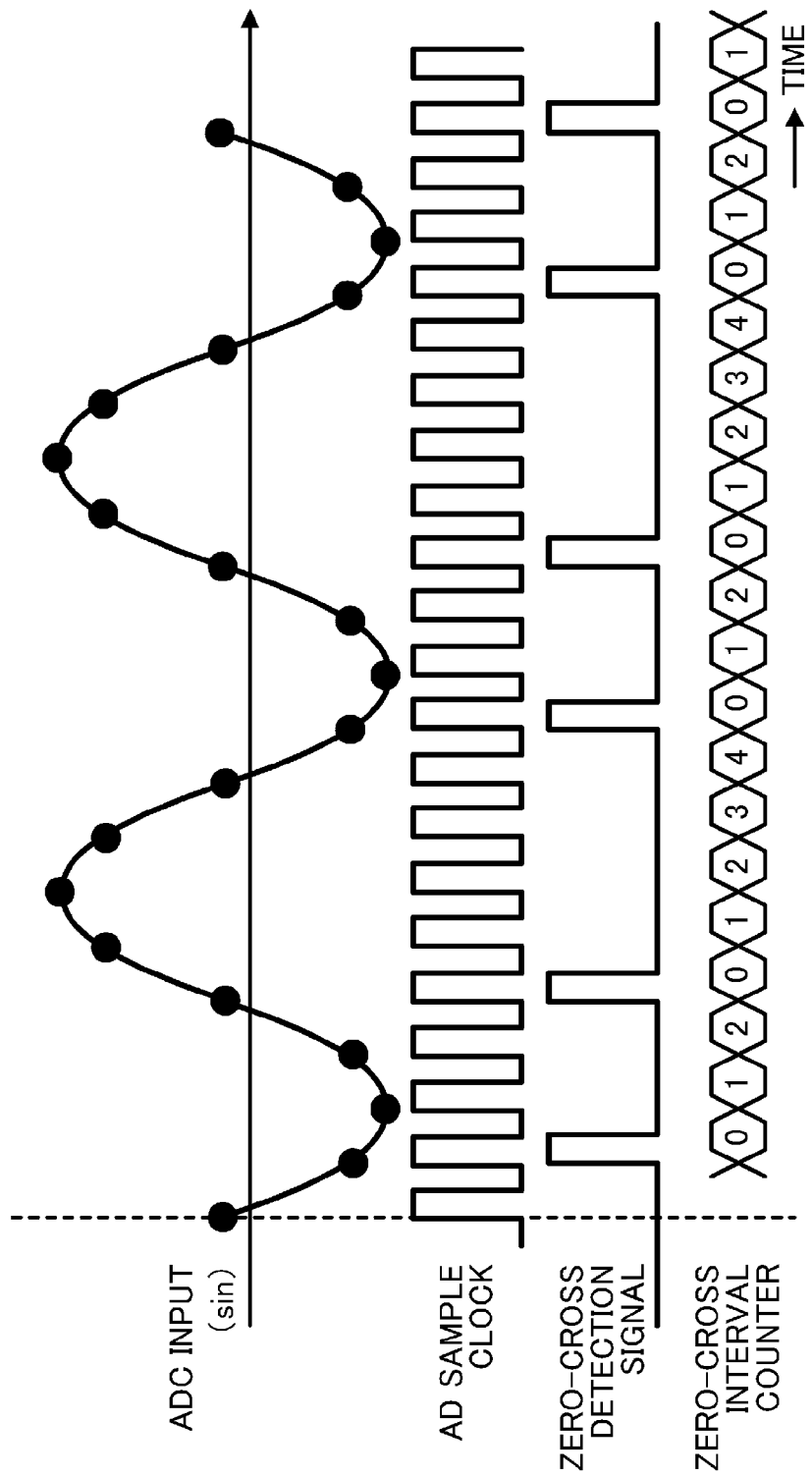
FIG. 22 is another signal waveform diagram for illustrating the operation of the orthogonal transform error corrector of FIG. 16.

FIG. 22 is another signal waveform diagram for illustrating the operation of the orthogonal transform error corrector of FIG. 16 where the input of the ADC is a sine wave.

Figure 23:
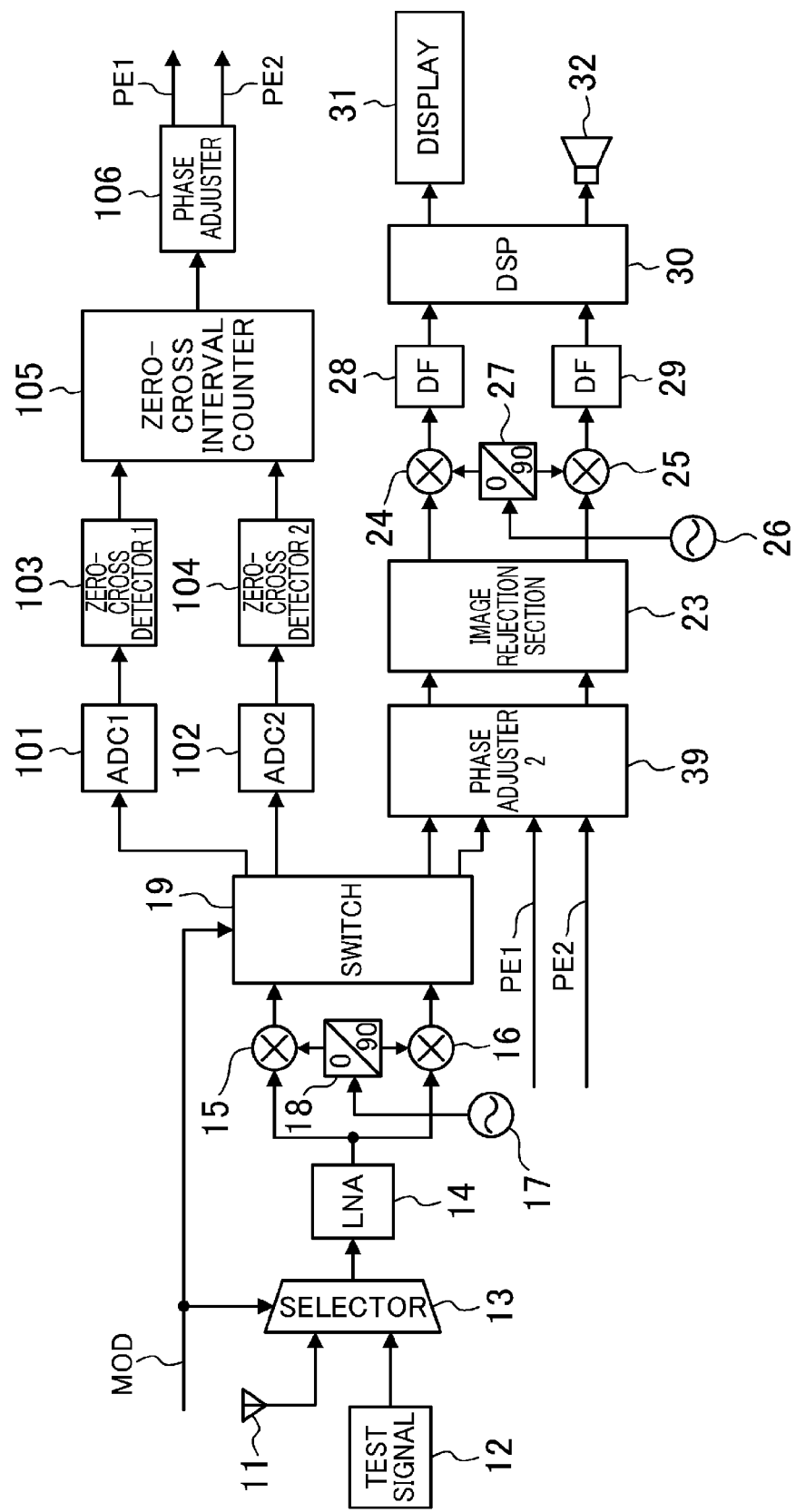
FIG. 23 is a circuit block diagram illustrating a variation of the receiver of FIG. 16.

FIG. 23 is a circuit block diagram illustrating a variation of the receiver of FIG. 16. Similar to FIG. 11, the receiver of FIG. 23 also includes a phase adjuster 39 between a switch 19 and an image rejection section 23. The phase adjuster 39 tunes a built-in filter (FIGS. 12 and 13) based on phase error signals PE1 and PE2 obtained by a phase adjuster 106.

Fourth Embodiment

Figure 24:
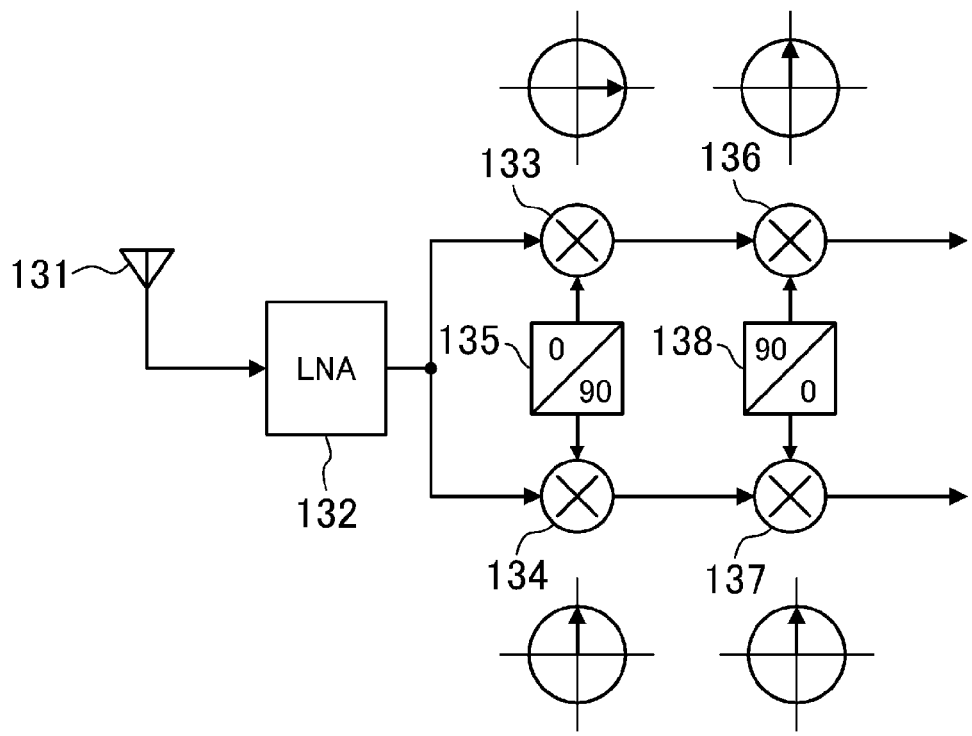
FIG. 24 is a circuit block diagram of an orthogonal transform error corrector according to a fourth embodiment of the present disclosure.

FIG. 24 is a circuit block diagram of an orthogonal transform error corrector according to a fourth embodiment of the present disclosure. The orthogonal transform error corrector of FIG. 24 has the configuration of a multi-stage mixer which includes an antenna 131, an LNA 132, mixers 133 and 134, a shifter 135, mixers 136 and 137, and a shifter 138.

In FIG. 24, the one shifter 135 shifts the phase by 0°/90°, and then the other shifter 138 shifts the phase by 90°/0° to perform inverse transform and extracts the original signal. Note that the mixers 133, 134, 136, and 137 need to be significantly accurate.

Fifth Embodiment

Figure 25:
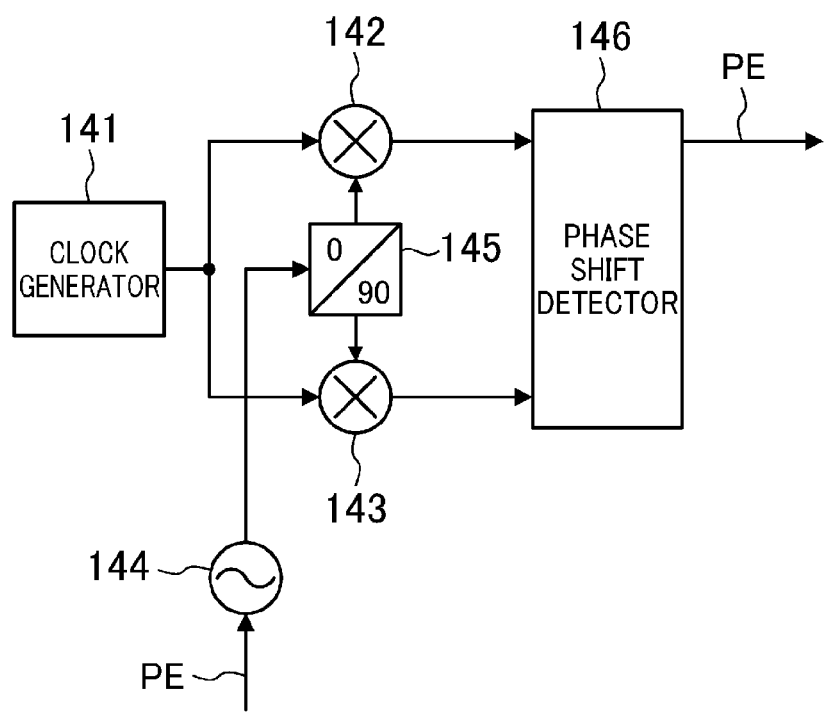
FIG. 25 is a circuit block diagram of an orthogonal transform error corrector according to a fifth embodiment of the present disclosure.

FIG. 25 is a circuit block diagram of an orthogonal transform error corrector according to a fifth embodiment of the present disclosure. The orthogonal transform error corrector of FIG. 25 includes a clock generator 141, mixers 142 and 143, an oscillator 144, a shifter 145, and a phase shift detector 146.

The clock generator 141 generates test signals such as clock signals. The mixers 142 and 143 output the waveform having a phase shifted by 90 degrees utilizing the oscillator 144 and the shifter 145. The phase shift detector 146 detects the shift of the waveform by a ¼ period using a TDC, and outputs a phase error signal PE. The oscillator 144 includes a phase adjustment section adjusting the edges of a clock based on the phase error signal PE, and correcting the phase shift of the original signal.

As above, while the first to fifth embodiments have been described in the specification, the functional blocks in this specification are typically implemented by hardware. For example, the functional blocks may be formed on a semiconductor substrate as a part of an integrated circuit (IC). The IC includes a large-scale integrated circuit (LSI), an application-specific integrated circuit (ASIC), a gate array, a field programmable gate array (FPGA), etc. Alternatively, whole or part of the functional blocks may be implemented by software. For example, such functional blocks may be implemented by a program executed by a processor. In short, the functional blocks described in this specification may be implemented by hardware, software, and a desired combination of hardware and software.

Numerous features and advantages of the present disclosure are clear from the description. It is thus intended that the scope of the attended claims cover all the features and advantages of the present disclosure. Since various modifications and variations are easily made by those skilled in the art, the present disclosure is not to be read as limited to the same configurations and operations shown in the drawings. All of modifications and equivalents may be resorted to, falling within in the present disclosure.

As described above, the present disclosure improves the accuracy in correcting orthogonal transform errors. The present disclosure is therefore useful for receivers, etc.

What is claimed is:

1. An orthogonal transform error corrector, comprising:
an orthogonal transform section configured to separate an in-phase signal and a quadrature signal from a complex signal;
a phase adjuster configured to arrange phases of waveforms after orthogonal transform;
an edge detection section configured to detect an edge of the complex signal after phase adjustment;
a phase shift detection section configured to detect phase shift of an output signal of the edge detection section; and
a phase adjustment section configured to correct phase shift of an original signal based on a phase shift amount detected by the phase shift detection section.

2. The orthogonal transform error corrector of claim 1, wherein the phase adjuster includes a filter performing delay processing.

3. The orthogonal transform error corrector of claim 1, wherein the phase adjuster corrects an amplitude.

4. The orthogonal transform error corrector of claim 1, wherein the edge detection section includes a delay element, a latch, and an AND circuit.

5. The orthogonal transform error corrector of claim 1, wherein the phase adjustment section performs delay processing using a plurality of delay elements.

6. The orthogonal transform error corrector of claim 1, wherein the orthogonal transform section shifts a phase by 0°/90° using one shifter, and then shifts the phase by 90°/0° using another shifter to extract the original signal.

* * * * *